United States Patent

Brzeski et al.

[11] 3,960,414
[45] June 1, 1976

[54] GAS-LUBRICATED BEARING

[75] Inventors: Lech Andrzej Brzeski; Zbyszko Kazimierz Kazimierski; Jan Eugeniusz Krysinski; Andrzej Witold Siwek, all of Lodz, Poland

[73] Assignee: Politechnika Lodzke, Lodz, Poland

[22] Filed: Dec. 24, 1974

[21] Appl. No.: 537,364

[30] Foreign Application Priority Data

Dec. 30, 1973 Poland .............................. 167778

[52] U.S. Cl. ................................... 308/9; 308/122; 308/DIG. 1
[51] Int. Cl.² ........................................ F16C 17/16
[58] Field of Search ................ 308/9, 72, 108, 122, 308/237 R, 237 A, 238, DIG. 1

[56] References Cited
UNITED STATES PATENTS 3,476,447  11/1969  Boyd ................................ 308/72 X
3,705,751  12/1972  Dee ........................................ 308/9

*Primary Examiner*—M. H. Wood, Jr.
*Assistant Examiner*—Gene A. Church
*Attorney, Agent, or Firm*—Haseltine, Lake & Waters

[57] ABSTRACT

A gas-lubricated bearing is provided with a bushing mounted in a housing by means of elastic rings mounted on ends. The surface of the hole in which the bushing is mounted, the outer surface of the bushing and the side surfaces of elastic rings form a chamber, in which throttling elements are located between the outlets of holes for feeding gas into it, and inlets of holes in the bushing on the periphery of the bushing. Elastic baffles are mounted along the longitudinal elements of the cylinder of the bushing.

1 Claim, 2 Drawing Figures

GAS-LUBRICATED BEARING

BACKGROUND OF THE INVENTION

The present invention relates to a gas-lubricated bearing. The hitherto known gas-lubricated bearings as described in the book: N. S. Grassam and J. W. Powell: "Gas-lubricated Bearings", London, Butterworths 1964, are provided with bushings pressed into a bushing hole or mounted in this hole by means of elastic rings. In the bushing, holes are provided for feeding gas at increased pressure into a slot between the bearing shaft and the bushing.

Another bearing is also known, as described in the paper of H. Mori and A. Mori: "Stabilising Method of Externally Pressurised Gas Journal Bearings", Southampton University Gas Bearing Symposium, April 1969, Paper 29 in which, with a view to elastic fastening in the housing of the bushing, the latter forms with the housing a clearance. This bearing is also fed a compressed gas, due to which, the bearing can reach a higher number of revolutions than in the case of a bearing pressed into the housing.

A disadvantage of known gas-lubricated bearings is their low rigidity compared to that of rolling-contact and sliding bearings. This often limits the range of their application.

In order to increase the rigidity in known gas lubricated bearings, pneumatic amplifiers are employed. These cause a build-up of the magnitude of pressure of the gas being fed, in the case of an increase of forces acting upon the bearing. Furthermore, with a view toward increasing the rigidity of gas-lubricated bearings, their supporting surface is often increased too.

Accordingly the object of the invention is to provide a gas-lubricated bearing with increased rigidity as compared with known gas-lubricated bearings of the same supporting surface.

SUMMARY OF THE INVENTION

The technical task set up for implementing the said object has been solved according to the present invention in the manner that the outer surface of the bushing mounted in the housing hole by means of elastic rings, the surface of this hole and the side surfaces of elastic rings form together a chamber. In this chamber and on the periphery of the bushing, between the outlets of holes designed for feeding gas into chamber, and the inlets of holes in the bushing for feeding gas to the surface of the mounted shaft, throttling elements are provided. Elastic elastic baffles are also mounted in the chamber along the longitudinal elements of the cylinder of the bushing.

The forces acting upon the shaft mounted in the bushing of the bearing cause not only its displacement, but also build up a difference of pressures in the chamber at the side of loading forces and its opposite side. This in turn causes a movement of the bushing towards a side opposite to the action of forces loading the shaft, and its return to the position it occuppied in an unloaded state. Due to this, the magnitude of displacement of the shaft per unit of the loading force in a direction of its action, practically equals zero or, the displacement of the shaft has a turn opposite to the turn of the loading force.

BRIEF DESCRIPTION OF THE DRAWING

The subject of the invention in an example of a design of a bearing for transferring forces vertically to its axis is illustrated in the drawing in which FIG. 1 shows the bearing in a section along its geometrical axis, while

DESCRIPTION OF THE PREFERRED EMBODIMENTS

Figure 1:
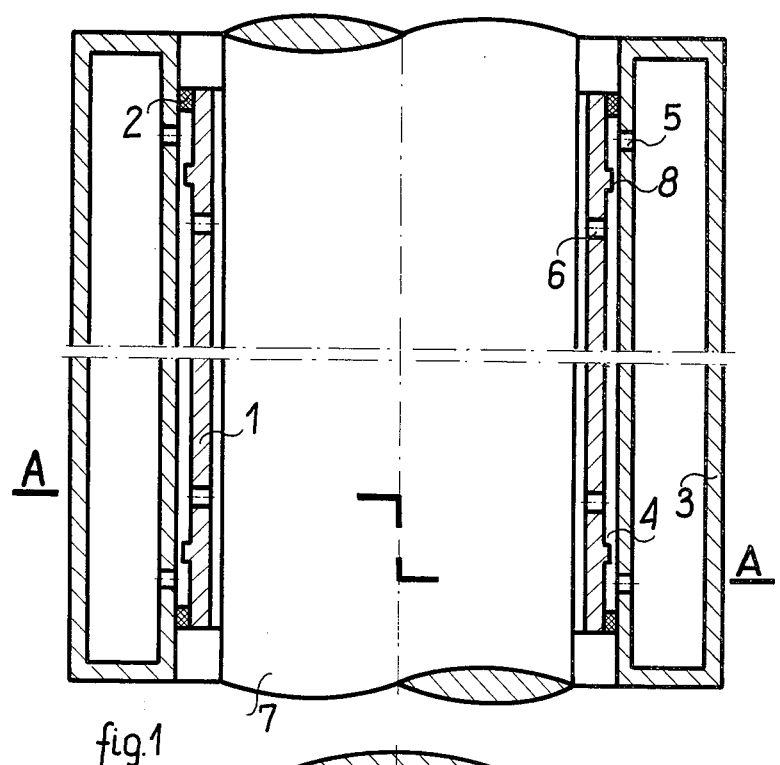
Figure 2:
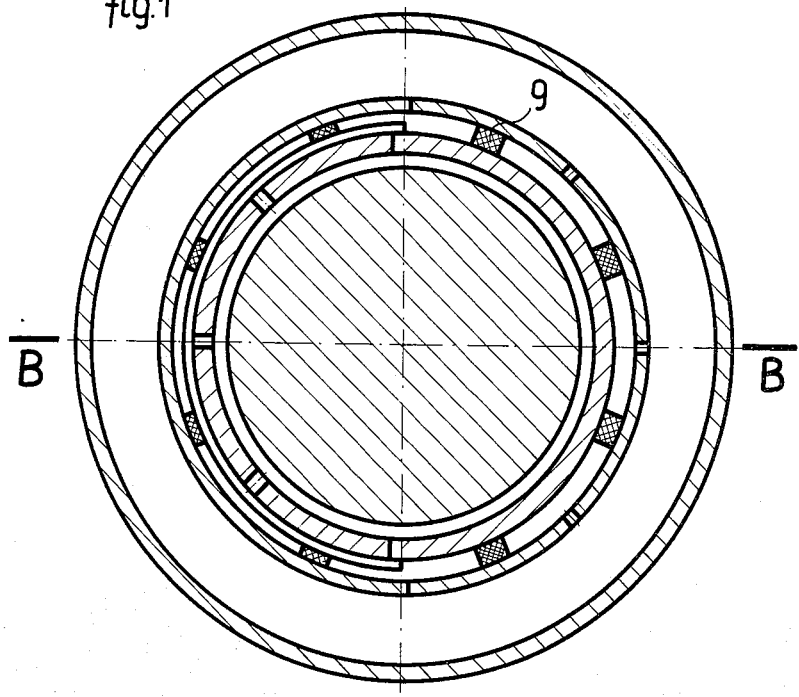
FIG. 2 — presents the bearing in cross-section along the line A—A in FIG. 1.

The bearing, according to the invention, is provided with bushing 1 mounted by means of elastic rings 2 in the housing 3. The outer surface of the bushing 1, the surface of the hole in the housing 3 and side surfaces of rings 2 form the chamber 4. Inside the chamber between holes 5 for feeding gas into it, and holes 6 for carrying off the gas to the surface of the mounted shaft 7, on the periphery of bushing 1, throttling elements 8 are located. Their flow section depends on the position of the bushing 1 relative to the housing 3. Along the longitudinal elements of the cylinder of the bushing 1, elastic baffles 9 are also mounted in the chamber 4.

The forces acting upon the shaft 7 cause a reduction of the slot between shaft 7 and bushing 1 at the side of loading forces, and its increase at the opposite side. The above action involves an increase and a drop of pressure in the slot between shaft 7 and bushing 1, and in the chamber 4 between bushing 1 and housing 3.

An increase of pressure in the chamber 4 at the side of forces acting upon the shaft 7, and a drop at the opposite side, causes a movement of the bushing 1 to the side lying opposite to forces acting upon the shaft 7, and the return of shaft 7 to the position it occupied in an unloaded state. The magnitude of displacement of bushing 1 is thereby limited by throttling elements 8 located at the side opposite to the action of the loading force.

The bearing according to invention has also a high rigidity, when instead of gas, it is fed with a liquid.

We claim:

1. A gas-lubricated bearing comprising, in combination, a housing, elastic rings with side surfaces, a cylindrical bushing mounted in a hole in said housing by said elastic rings, chamber means formed by the outer surface of said bushing and surface of said hole as well as the side surfaces of said elastic rings; said housing having outlet holes for feeding gas into said chamber means, said bushing having inlet holes for feeding gas to the surface of the shaft to be held in said bearing, throttling elements located on the periphery of said bushing between said outlet holes and said inlet holes, and elastic baffles in said chamber means along the longitudinal axis of said bushing.

* * * * *